United States Patent
Coppola et al.

(10) Patent No.: US 7,200,454 B2
(45) Date of Patent: Apr. 3, 2007

(54) METHOD, SYSTEM, AND STORAGE MEDIUM FOR INTEGRATING REWORK OPERATIONS INTO AN ADVANCED PLANNING PROCESS

(75) Inventors: J. Kenneth Coppola, San Jose, CA (US); Brian T. Denton, Winooski, VT (US); Grant L. MacKay, Concord, NC (US); Robert J. Milne, Jericho, VT (US)

(73) Assignee: International Business Machines Corporation, Armonk, NY (US)

( * ) Notice: Subject to any disclaimer, the term of this patent is extended or adjusted under 35 U.S.C. 154(b) by 136 days.

(21) Appl. No.: 10/610,948

(22) Filed: Jun. 30, 2003

(65) Prior Publication Data

US 2004/0267396 A1 Dec. 30, 2004

(51) Int. Cl.
*G06F 19/00* (2006.01)

(52) U.S. Cl. .................................. 700/105; 700/107

(58) Field of Classification Search .............. 700/105, 700/107; 705/28, 29
See application file for complete search history.

(56) References Cited

U.S. PATENT DOCUMENTS

| | | | |
|---|---|---|---|
| 4,419,747 A | | 12/1983 | Jordan |
| 5,089,970 A | * | 2/1992 | Lee et al. ...................... 700/96 |
| 5,099,431 A | * | 3/1992 | Natarajan .................... 700/105 |
| 5,191,534 A | * | 3/1993 | Orr et al. ..................... 700/105 |
| 5,239,487 A | * | 8/1993 | Horejsi et al. ............... 702/184 |
| 5,630,070 A | * | 5/1997 | Dietrich et al. ................. 705/8 |
| 5,943,484 A | | 8/1999 | Milne et al. |
| 5,971,585 A | | 10/1999 | Dangat et al. |
| 6,684,117 B2 | * | 1/2004 | Bacin et al. ................... 700/98 |
| 6,850,904 B2 | * | 2/2005 | Ballas et al. ................. 705/29 |
| 6,871,110 B1 | * | 3/2005 | Yen et al. .................... 700/100 |
| 6,904,329 B1 | * | 6/2005 | Barto et al. ................... 700/99 |
| 6,957,186 B1 | * | 10/2005 | Guheen et al. ................. 705/1 |
| 7,039,597 B1 | * | 5/2006 | Notani et al. ................... 705/9 |

OTHER PUBLICATIONS c W. Weisstein. "Linear programming." From MathWorld—A Wolfram Web Resource. http://mathworld.wolfram.com/LinearProgramming.html.*

"Engineering Change Management" -Microsoft Dynamics GP. Copyright 2005, printed from http://www.microsoft.com/dynamics/gp/.*

"The Role of Bill-Of-Materials as a CAD/CAPM interface and the key importance of engineering change control" -Maull et al, Computing and Control Engineering Journal, Mar. 1992.*

"Profitable Innovation in High Tech" -Oracle PLM. Copyright 2002-2003. Printed from http://www.oracle.com/start/.*

(Continued)

Primary Examiner—Michael D. Masinick
(74) Attorney, Agent, or Firm—Cantor Colburn LLP

(57) ABSTRACT

An exemplary embodiment of the invention relates to a method, system, and storage medium for integrating rework operations into an advanced planning process. The method comprises: providing at least one rework Bill of Materials flow for use in conjunction with other Bills of Materials flow in a production planning process; forecasting rework parametric information associated with the rework Bill of Materials flow; and generating an integrated manufacturing plan utilizing the rework parametric information and the rework Bill of Materials flow. The rework parametric information includes at least one of: yields; cycle times; capacities; and rework materials. Other embodiments of the invention include a system, and a storage medium.

18 Claims, 6 Drawing Sheets

OTHER PUBLICATIONS

PCT Search Report dated Apr. 7, 2005, International Application No. PCT/US04/20443.

Internet Citing: Mathworld; "Linear Programming;" Wood and Dantzig 1949, Dantzig 1949 [retrieved on Feb. 17, 2005]; retrieved from the Internet http://www.mathworld.wolfram.com/LinearProgramming.html.

A. Grosfeld-Nir, Y. Gerchak, "Multistage Production to Order with Rework Capability", Management Science/vol. 48. No. 5, May 2002, pp. 652-664.

J. Chen, D. D. Yao, S. Zheng, "Optimal Replenishment and Rework with Multiple Unreliable Supply Sources", Operations Research, vol. 49, No. 3, May-Jun. 2001, pp. 430-443.

* cited by examiner

REWORK_YIELD — 202
    Location
    ProductHierarchy
    PartNumber
    FirstPassYield
    ReworkYield
    ReworkScrap
    EffectiveDates
    WorkOffStart
    MultiplePass REWORK_CT — 204
    Location
    ProductHierarchy
    PartNumber
    ReworkCycleTime
    EffectiveDates REWORK_CAPACITY — 206
    Location
    ProductHierarchy
    PartNumber
    CopyFromPN
    WorkCenter
    ReworkWeightFactor
    BaseConsumption
    EffectiveDates REWORK_MATERIAL — 208
    Location
    AssemblyProductHierarchy
    AssemblyPartNumber
    ComponentProductHierarchy
    ComponentPartNumber
    ConsumeCreateFlag
    OffsetDays
    UsageRate
    Reworkable
    EffectiveDates PRODUCT HIERARCHY — 210
    ProductHierarchy
    PartNumber INVENTORY_COST — 212
    Location
    ProductHierarchy
    PartNumber
    EffectiveDates
    CostPerPieceOfInventory PROCESS_COST — 214
    Location
    ProductHierarchy
    PartNumber
    Process
    EffectiveDates
    CostPerPieceReleased INVENTORY — 216
    Location
    PartNumber
    QualInd
    Quantity

FIG. 2

METHOD, SYSTEM, AND STORAGE MEDIUM FOR INTEGRATING REWORK OPERATIONS INTO AN ADVANCED PLANNING PROCESS

BACKGROUND

The present invention relates generally to manufacturing rework processes, and more particularly, the present invention relates to a method, system, and storage medium for integrating rework operations into an advanced planning process.

In a manufacturing environment, the process of rework refers to the handling of products and assemblies that are found to be defective, either because the manufacturing process is flawed or because one or more components of the product of manufacture is flawed. The flaws are often detected during a testing procedure that occurs at a specified point in the manufacturing process such as the completion of a subassembly fabrication.

Despite these defects, many products can be reworked by replacing defective components in the products or assemblies or by repeating a particular operation in the manufacturing system. Assemblies that cannot be reworked may be a source of "salvageable" component parts whereby the assembly is broken down and the working components are kept. Salvageable components are then fed back into the manufacturing process. The processes involved in conducting rework and salvage in a manufacturing system translate into circular material flows of component parts. Advanced planning systems have attempted to manage this circular material flow, but with little success.

Advanced planning systems (APS) are used to optimize supply chain planning decisions. They leverage mathematical models (e.g., linear programs) to optimize planning decisions including the build plan for the manufactured parts (e.g., assemblies, subassemblies, components) at the manufacturing plants in a division, interplant logistics, and customer shipments. To determine the optimal plan, they trade off several criteria to determine an optimal allocation of limited work center capacity and material supply to best meet a prioritized customer demand statement.

For industries with a significant rework aspect to their manufacturing system, it would be beneficial to provide the details of the rework process to the APS so that the impact of two-way material flows in the plan can be captured. This would involve providing detailed information about the rework bill of material (BOM), capacity resources required for performing rework operations, replacement parts sorting percentages reflecting the fraction of parts requiring rework, and cycle times for completing rework operations. With this information, the rework process can be integrated with the APS mathematical model.

SUMMARY

An exemplary embodiment of the invention relates to a method, system, and storage medium for integrating rework operations into an advanced planning process. The method comprises: providing at least one rework Bill of Materials flow for use in conjunction with other Bills of Materials flow in a production planning process; forecasting rework parametric information associated with the rework Bill of Materials flow; and generating an integrated manufacturing plan utilizing the rework parametric information and the rework Bill of Materials flow. The rework parametric information includes at least one of: yields; cycle times; capacities; and rework materials. Other embodiments of the invention include a system, and a storage medium.

BRIEF DESCRIPTION OF THE DRAWINGS

Referred now to the drawings wherein like elements are numbered alike in the several FIGURES:

FIG. 2 illustrates a rework data model utilized by the rework system in an exemplary embodiment;

DETAILED DESCRIPTION OF THE PREFERRED EMBODIMENT

Rework operations are integrated into an advanced planning process via the rework system of the present invention. The rework system leverages a linear programming (LP) model of the production planning process and provides a circular flow of materials' structure. The rework system is modeled using a set of inventory balance equations to describe the flow of materials (also referred to as 'BOM flow') from one part number's inventory holding point to the next. The solution uses a unique part number (also referred to as 'test part number') to describe the part which has completed all operations prior to the test operation; in other words the 'test part number' is ready to be tested. The solution uses another unique part number (also referred to as 'rework part number') to describe the part which has been identified as requiring rework; in other words, it is a reworkable part number. Sort percentages are used on the part going through testing to indicate the percentage of good, reworkable, or salvageable units that will be generated. Cost penalties may be applied in the linear programming model so that the desired behavior during a product life cycle (e.g., during new product 'ramp up' the rework system is not used, only a new build system to satisfy demand) can be emulated in the planning process.

For illustrative purposes, the invention is described with respect to a sample bills of material (BOM) flow for a hard disk drive. It will be understood by those skilled in the art that the rework system is applicable to a variety of product structures.

Figure 1:
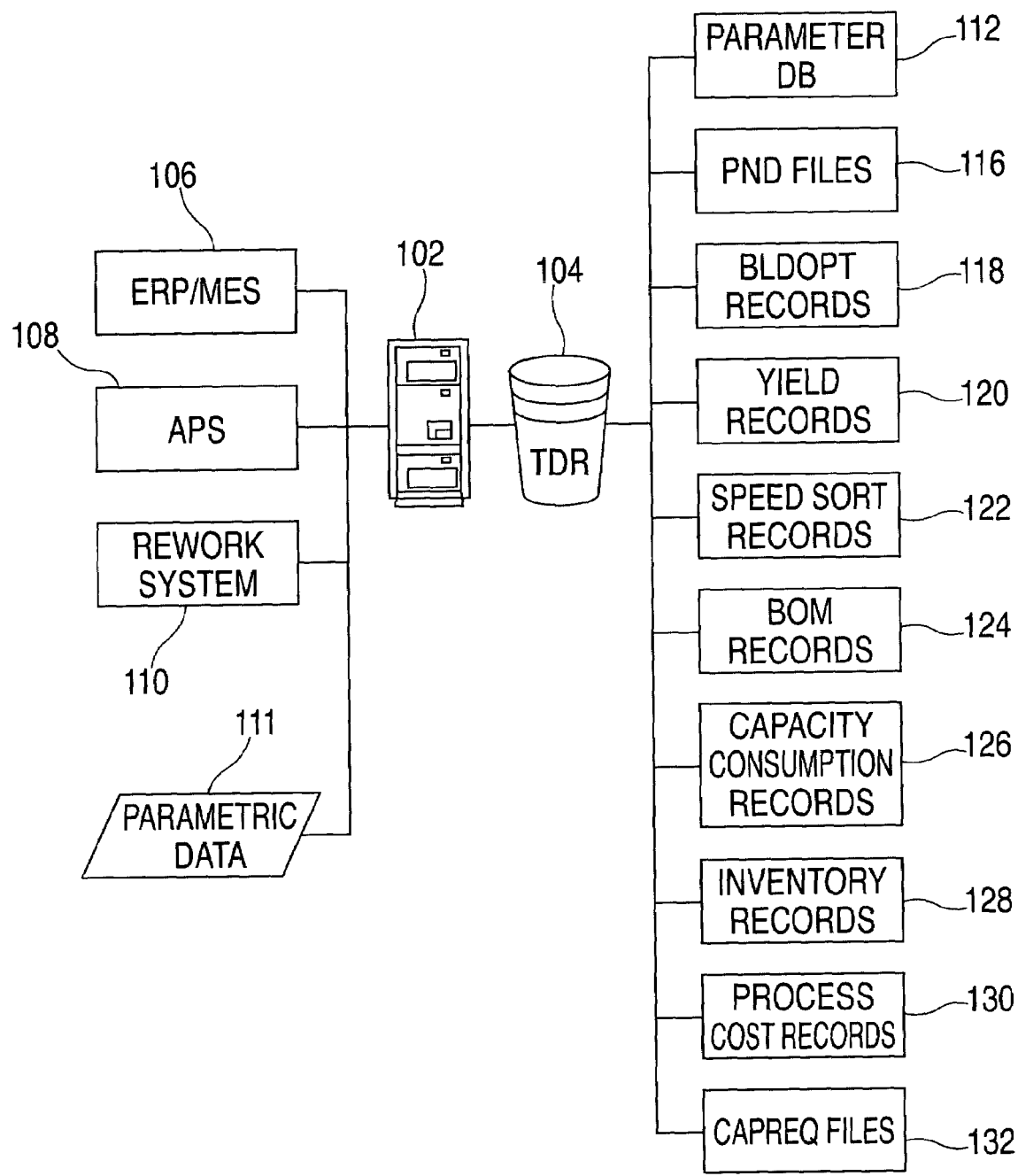
FIG. 1 is a block diagram of a portion of a system upon which the rework system is implemented in an exemplary embodiment.

A manufacturing system 100 includes a server 102 and a technical data repository 104 coupled together via a communication link such as network cabling. For illustrative purposes, server 102 is an IBM P690O utilizing IBM's AIXO operating system and DB2O for data storage. Server 102 executes various business software applications typically associated with a manufacturing enterprise. Such software includes enterprise resource planning/manufacturing execution system software 106, and advanced planning system 108. In the manufacturing system 100 of FIG. 1, server 102 is executing the rework system 110 of the invention. The rework system 110 is preferably implemented as an enhancement to an existing production planning or advanced planning application such as the tool described in U.S. Pat. No. 5,971,585, entitled "Best Can Do Matching of Assets With Demand in Microelectronics Manufacturing" which was issued on Oct. 26, 1999, assigned to the assignees of the present invention, and is incorporated by reference herein in its entirety. The above-referenced tool is a computer implemented decision support application that generates a "best can do" match between existing assets and demands within boundaries established by manufacturing specifications, process flows, and business policies to determine which demands can be met in a specified time period.

Parametric data 111 provides input to the rework system 110 and is obtained via user input to the templates of rework data model 200 described in FIG. 2. Parametric data 111 is described further herein.

Technical data repository 104 stores a plurality of databases used by the rework system 110 including parameter database 112, part number definition (PND) files database 116, build options (BLDOPT) records database 118, yield records database 120, speed sort records database 122, BOM records database 124, capacity consumption records database 126, inventory records database 128, process cost records database 130, and CAPREQ files database 132. These databases are used as input to the rework system 110 and are also modified by rework system 110 and thus may be considered output of rework system 110.

PND files store part number data on each part that goes through a manufacturing process. These files also describe hierarchical relationships or groupings of part numbers. The PND file is updated whenever test and/or rework parts are added to the system.

BLDOPT files define the processes which may be used to purchase or manufacture a part number at a given location. Each BLDOPT record would include the following attributes: PartNumber Location, Process, Effective Dates, and an indicator as to whether the part number is manufactured or purchased using the process at the specified location.

Yield records define the percentage of product that is "good" according to a test operation. Each YIELD record includes the following attributes: PartNumber, Location, Process, Effective Dates, yield. The speed sort records define the percentage of good product which results in each particular output part number. For example, in a semiconductor manufacturing operation, a successful test may result in a product which is designated or sorted as: fast, medium speed, or slow. The fast, medium, and slow speed products would be represented as three different part numbers in the speed sort records. Each speed sort record includes the following attributes: input part number, location, process, Effective Dates, output part number, and percentage of output part number resulting from the speed sorting operation. Continuing with the example, one speed sort record would contain the unsorted (prior to testing) part number as the input part number, the slow speed part number as the output part number, and a percentage indicating how much of the product will be slow speed.

Each BOM record contains an assembly part number, location, process, component part number, and quantity of the component part number which is consumed per piece released of the assembly part number. These databases will be described further in the context of the rework data model depicted in FIG. 2 as well as the method steps recited in FIG. 3.

Technical repository 104 may comprise any form of mass storage device configured to read and write database type data maintained in a file store and is logically addressable as a consolidated data source across system 100. Information stored in technical repository 104 is retrieved and manipulated via server 102. It will be understood that more than one server may be utilized by system 100 in order to accommodate a high volume of manufacturing activities typically generated in a large organization. Further technical repository 104 and server 102 may comprise a single unit such as, for example, a mainframe computer.

As indicated above, current ERP systems used in a manufacturing process do not support rework planning. The rework system of the invention includes a rework data model for integrating an advanced manufacturing execution system's rework requirements with a planning system that accommodates a circular flow of materials. A rework BOM flow is provided to the rework system 110. A BOM flow defines the movement of manufactured parts throughout the manufacturing system from one stocking point to the next. A user enters forecasted parameter data 111 in accordance with historical rework yields and similar considerations via templates of rework data model 200. The rework system 110 generates a manufacturing plan using the parametric information and the rework BOM flow. The rework data model and types of data provided by a user are described in FIG. 2.

The rework data model 200 and corresponding parameter templates 202–216 will now be described. Rework parameter templates 202–216 are created via rework system 110 and maintained in parameter database 112 of FIG. 1. Rework parameter templates include rework yields (REWORK_YIELD) 202, rework cycle time (REWORK_CT) 204, rework capacity (REWORK_CAPACITY) 206, rework materials (REWORK_MATERIAL) 208, product hierarchy (PRODUCT_HIERARCHY) 210, inventory cost (INVENTORY_COST) 212, process cost (PROCESS_COST) 214, and inventory materials (INVENTORY) 216.

Rework yield template 202 maintains nine elements as depicted in FIG. 2. 'Location' refers to the place where the manufacturing occurs. 'ProductHierarchy' allows for parameters to be defined hierarchically as described further in PRODUCT_HIERARCHY template 210 below. 'PartNumber' allows parameters to be defined at the part number level. 'FirstPassYield' refers to the percentage of parts that successfully pass testing (i.e., are designated as "good product") on the first loop or pass. 'ReworkYield' refers to the percentage of parts that successfully pass testing each rework loop or pass. 'ReworkScrap' refers to the percentage of materials scrapped for each rework pass. 'EffectiveDates' refers to a time frame for which the above parameters are effective. 'WorkOffStart' refers to the first date the rework process is usable/qualified. 'MultiplePass' is a 'yes/no' indicator which indicates whether the rework process path may be executed more than once. In other words, when the testing of a product following a rework operation indicates that the product is not usable, and the MultiplePass indicator is 'yes', then at least some of the product may be reworked again. However, if the MultiplePass indicator is 'no', then the product may be reworked only a single time whereby any product failing the test is scrapped.

Rework cycle time template 204 is used to describe the amount of time it takes to rework the product. Typically, this Rework cycle time includes the time that rework jobs wait for manufacturing equipment to become available. Rework cycle time template maintains five elements: 'Location', 'ProductHierarchy', 'PartNumber', 'ReworkCycleTime', and 'EffectiveDates'. 'ReworkCycleTime' refers to the duration of the rework process. The remaining four elements are similar to the corresponding elements provided above with respect to the rework yield template.

Rework Capacity template 206 links the rework process and the product to the capacity that the rework process will consume. This is defined in terms of the tools and units normally expressed in the planning process (e.g., rough cut or finite capacity planning). When consuming capacity, consideration is made about the rate at which the rework product will consume capacity. If the rework and new/virgin build products share a common capacity point, then a ratio can be applied to the new build capacity consumption rate to represent what each piece reworked will consume. This ratio needs to consider any differences that the rework process may possess (e.g., does reassembling a product take more or less time than assembling the product the first time). The ratio also needs to consider any effect that product fallout during the rework process may have. Typically planning systems consume capacity based on the quantity started, and if there is fallout before the capacity point, the ratio should take this fallout into consideration.

The rework capacity template 206 maintains eight elements: 'Location', 'ProductHierarchy', 'PartNumber', 'CopyFromPN', 'WorkCenter', 'ReworkWeightFactor', 'BaseConsumption', and 'EffectiveDates'. 'CopyFromPN' is an optional item used to link the referenced part number to an existing part number. 'WorkCenter' refers to the name of the manufacturing work center. 'ReworkWeightFactor' is a multiplier used for capacity usage and is defined by referencing the new build process. 'BaseConsumption' refers to the usage rate if capacity consumption is defined without reference to a new build. The remaining four elements are similar to the corresponding elements provided above.

Rework material template 208 links the rework process and the product to the materials normally consumed while reworking, expressed as a percentage. For example, if Product A has its motor replaced 40% of the time when being reworked, this record would link Product A to the motor with a consumption rate of 0.4. This information can also be used to define the materials that are created during the rework process. For example, if the motors that are replaced during the reworking of the disk drive can themselves be reworked, then these reworkable motors can be considered a byproduct of the disk drive rework process. These byproducts may feed back into the supply chain and be used for subsequent product.

The rework material template 208 maintains ten elements: 'Location', 'AssemblyProductHierarchy', 'AssemblyPartNumber', 'ComponentProductHierarchy', 'ComponentPartNumber', 'ConsumeCreateFlag', 'OffsetDays', 'UsageRate', 'Reworkable', and 'EffectiveDates'. 'AssemblyProductHierarchy' refers to the product hierarchy associated with a set of assembly part numbers for those part numbers resulting from a successful test during the rework operations. 'AssemblyProductHierarchy' is used to maintain and retrieve data at a level of detail higher than the part number level of detail. 'AssemblyPartNumber' refers to a part number resulting from a successful test during the rework operations. 'ComponentProductHierarchy' refers to the product hierarchy associated with a set of component part numbers for those part numbers consumed during the rework operations or created as a result of an unsuccessful test during the rework operations. 'ComponentPartNumber' refers to a part number being consumed during the rework operation or created as a result of an unsuccessful test during the rework operations. In the latter case, the component part number would be considered a byproduct. 'ConsumeCreateFlag' is used to indicate whether the material referenced here is consumed or created. 'OffsetDays' refers to the number of days between the beginning of the rework process and the consumption/creation of the material. 'UsageRate' refers to the consumption/create rate per piece. 'Reworkable' indicates whether the created material is also reworkable. It will be understood that the reworking of a product may create another product that is reworkable.

Product hierarchy template 210 allows for parameters to be defined hierarchically. It enables like parts to be grouped together for simplification of data maintenance. For example, if there are twenty parts that belong to a hard disk family, and certain parameters are the same for each part number in this family, then data can be maintained once at the family level, rather than twenty times at the item or part number level. In addition, Product Hierarchy template 210 allows other data files to be maintained at a higher level of detail than part number. For example, suppose all part numbers in a "blue" product hierarchy consumed two minutes of capacity at the paint station. The capacity consumption database 126 would contain a record specifying that "blue" products consume two minutes of painting capacity.

The rework system utilizes the PND file described above to map the part numbers to product hierarchy information which could be used to establish the paint capacity required for the part numbers in the blue hierarchy.

Product hierarchy template 210 includes two attributes: 'ProductHierarchy' refers to the family to which the part number belongs. 'PartNumber' represents the specific manufacturing items that belong to this family.

Inventory cost template 212 defines the cost or penalty of holding a piece of inventory at the end of a time period. This inventory cost is used in establishing cost coefficients in the linear programming model. Inventory cost template 212 includes five attributes: 'Location', 'ProductHierarchy', 'PartNumber', EffectiveDates, and CostPerPieceOfInventory.

Process cost template 214 describes the cost or penalty of releasing or starting the manufacture of each piece of the product. Process cost template 214 includes six attributes: 'Location', 'ProductHierarchy', 'PartNumber', 'Process', 'EffectiveDates', and 'CostPerPieceReleased'.

Inventory materials template 216 indicates the quantity of inventory materials at various stages of production. This template 216 includes four attributes: 'Location', 'PartNumber', 'QualInd', and 'quantity'. A QualInd of "UT" (Untested) indicates that the inventory material has not yet been tested. A QualInd of "RW" indicates that the inventory material is reworkable (i.e. the test result indicated that reworking of this inventory material is required).

Once parameter database 112 is established, the rework system 110 may be implemented in accordance with the parameters provided via the rework data model elements defined in FIG. 2. In order for this data to be properly represented, it is important to note that a given product may be manufactured in multiple ways. This is required so that the linear programming-based production planning system can construct the necessary inventory balance equations to reflect that the good finished part number can be made either from new build or reworkable products using alternate bills of materials. These will require, therefore, different bills of materials for the same product. Thus, the planning engine needs appropriate data input to recognize that a product can also create itself (e.g., a part may require multiple passes through rework operations). In the rework model of the present invention, the rework process starts with reworkable parts, and ends with reworkable parts for that percentage of product that is not successfully reworked.

Figure 3:
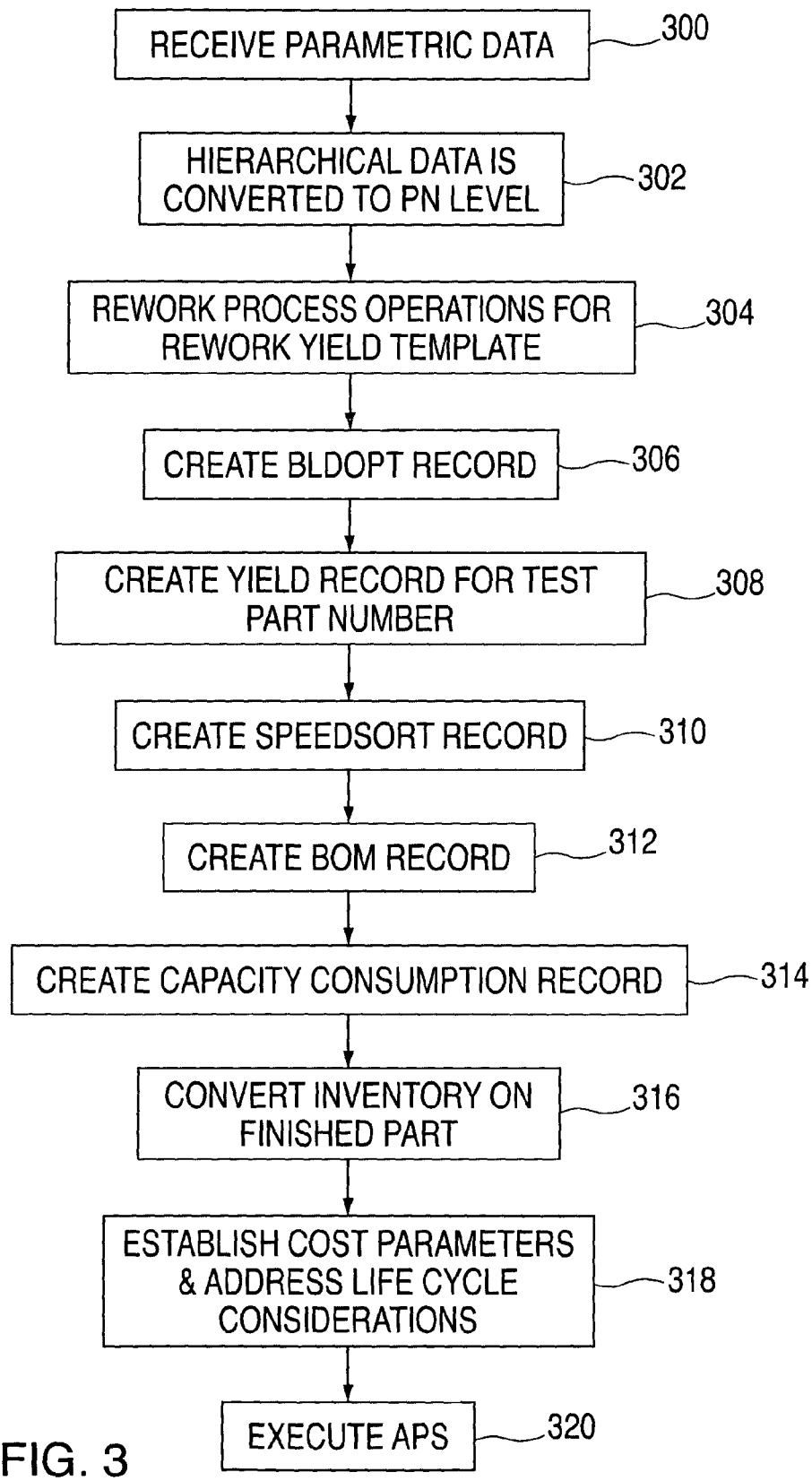
FIG. 3 is a flowchart describing a process for implementing the rework system in an exemplary embodiment.

The execution of the rework system is described in FIG. 3. A user supplies parametric data 111 to rework system 110 via templates 202–216 at step 300. This data is the result of historical rework yields and current production information. The hierarchical data for templates 202–216 is converted to part number level detail at step 302. This is accomplished using the product hierarchy template 210. In the rework material template 208, any records that have the Assembly or Component part numbers left blank will be converted to 'PartNumber', otherwise it is assumed that the data is already at the part number level. In the rework yield, rework cycle time, and rework capacity templates, the data is converted to part number where the part number field is blank. If the PartNumber field is populated, then it is assumed that the data is already at the part number level.

Step 302 is described more precisely as follows. First, the invention determines a set of part number/location combinations (hereinafter PN_LOC_SET) which consists of those parts/locations which either exist in the REWORK_YIELD 202 template or which have a Product_Hierarchy in the PRODUCT_HIERARCHY 210 template which corresponds to a Product_Hierarchy in the REWORK_YIELD 202 template. Thus, PN_LOC_SET is a set of part numbers/locations for which the method will attempt to create part number level records in the REWORK_YIELD 202, REWORK_CT 204, REWORK_CAPACITY 206, and REWORK_MATERIALS 208.

The conversion of the REWORK_CAPACITY template to a part number level of detail may be accomplished as follows. One of the inputs to this process are the Capacity Consumption records for new build products (CAPREQ). This is done so that the REWORK_CAPACITY 206 template can reference existing new build part number/work center relationships if needed, or the REWORK_CAPACITY 206 template can define a new part number/work center relationship. For example, newly built products and rework products both require testing. The rework test process may take longer, as a more stringent test may need to be performed. This template allows for the maintenance of a weighting factor, say 1.50, which would indicate the rework test process takes one and one half the time to test as a newly built product. The REWORK_CAPACITY 206 template also allows for the creation of new part number/work center relationships. For example, a "Disassembly" step would only exist for rework, so the assumption made when processing this file is that if the part number/work center relationship cannot be found in the CAPREQ file, then a new relationship is created with the consumption rate equal to the weighting factor. CAPREQ file 132 includes the following entries: 'Location', 'Part Number', 'Work Center', and 'Consumption Rate'.

For each part number, location (hereinafter PN_LOC) in PN_LOC_SET which exists in REWORK_CAPACITY 206 and which has a non-blank CopyFromPN in REWORK_CAPACITY 206, the CAPREQ 132 information is retrieved where the PartNumber and Location in CAPREQ 132 correspond to the non-blank CopyFromPN and the location of PN_LOC, respectively. This information is copied into REWORK_CAPACITY 206 for the PN_LOC, additionally multiplying the 'Consumption Rate' from CAPREQ 132 by the 'Weighting Factor' from REWORK_CAPACITY 206. Conversely, if there are no CAPREQ 132 records for the PN_LOC, the invention retrieves the part number's ProductHierarchy from the PRODUCT_HIERARCHY template. If there is another part number which has the same ProductHierarchy in the PRODUCT_HIERARCHY template and which exists in CAPREQ 132, then that part number's CAPREQ 132 information is copied into the REWORK_CAPACITY 206 for PN_LOC. Otherwise, if there is a record for the PN_LOC's ProductHierarchy in REWORK_CAPACITY 206, then the ProductHierarchy's REWORK_CAPACITY 206 information is copied into the REWORK_CAPACITY 206 for PN LOC.

The conversion of the REWORK_MATERIALS 208 template to a part number level of detail presumes that the data entered at a 'PartNumber' level is in addition to the data entered at other levels, and further presumes that it is not necessary to copy data from other part numbers. Briefly, the conversion of REWORK_MATERIALS 208 to a part number level detail involves generating assembly/component combinations corresponding to the AssemblyProductHierarchy/ComponentHierarchy information and applying this information only when there are matching BOM records (i.e. only when the bill of material combination is valid).

More precisely, this conversion works as follows. For each REWORK_MATERIALS 208 record, if the 'AssemblyPartNumber' field is blank, then all part numbers (hereinafter ASSM_PNS) which have a ProductHierarchy in PRODUCT_HIERARCHY 210 matching the AssemblyProductHierarchy are retrieved. If the REWORK_MATERIALS 208 record has a 'ComponentPartNumber' of blank, the invention finds all part numbers (hereinafter COMP_PNS) which have a ProductHierarchy in PRODUCT_HIERARCHY 210 matching the ComponentProductHierarchy. The ASSM_COMP is set to all assembly part number—component part number combinations of the REWORK_MATERIALS record where the assembly part number is either the REWORK_MATERIAL's non-blank AssemblyPartNumber or a member of ASSM_PNS and where the component part number is either the REWORK_MATERIAL's non-blank ComponentPartNumber or a member of COMP_PNS. For each assembly part, component part combination in ASSM_COMP, if the assembly part, component part are both present in a same BOM record 124 where the BOM record's location matches that of the REWORK_MATERIALS 208 record, and there is not already a REWORK_MATERIALS 208 record for the ASSM_COMP's AssemblyPartNumber/ComponentPartNumber at this location, a REWORK_MATERIALS 208 record is created where the ASSM_COMP's assembly part number and component part number are AssemblyPartNumber and ComponentPartNumber and the other information is copied from the REWORK_MATERIALS 208 record.

At step 304, the rework yield template 202 triggers the continuance of the rework process. If there are entries in the other rework templates 204–208, but not in the rework yield template 202, no further processing will occur for that part number. The 'Location' and 'PartNumber' combination must also be in the base data used as input, so that the rework parameters for those part numbers not already in the base model will not be processed. The existence of a part number in the rework yield template 202 will cause the rework system 110 to create a 'test' part number in the PND file stored in database 116. The original part number as provided in the original BOM will be referred to herein as the "finished" part number, since that is what truly represents good finished materials. The test part number will have its second and third digits replaced with a "UT" or an alternative change to designate that it is the test (untested) part number. The test part number is created shortly after an assembly/manufacturing process for the part has been completed but before the part is tested. This part number will be added to the PND file with the same product family. The rework part number will have its second and third digits replaced with a "RW" or an alternative change to designate that it is the rework (reworkable) part number. The rework part number represents a part that has completed testing and determined to require reworking. This part number will be added to the PND file with the same product family as the finished part number.

A BLDOPT record is created at step 306. The test part number is stored in the BLDOPT file in database 118. The test part number is assigned a process code based upon what was entered for the finished part originally (hereinafter referred to as the "primary process" which is used for new/virgin build), and a 'ProcurementInd' of "M" (where "M" indicates the part is manufactured), and the same location as defined in the rework parameters. Effective dates may range from 01/01/1999 through 12/31/9999. The reworkable or "rework" part number for the primary process is stored in the BLDOPT file. The rework part number is assigned the primary process as the process code, and the same location as defined in the rework parameters.

If the MultiplePass flag of rework yield template 202 is set to "Y", then the product may be reworked multiple times. In this situation, the rework part number is not only consumed during the rework process but also results as output from the rework process. The rework part number will get a process code of P_RW and a 'ProcurementInd' of "M", as well as the same location as defined in the rework parameters. The effective start date of the BLDOPT record will come from the 'WorkOffStart' field of rework yield template 202 and the effective end date will be 12/31/1999. If the 'WorkOffStart' field is blank, or invalid, then the start date will be 01/01/1999.

A new process code of P-RW is created for the finished part number to represent the fact that the finished part number can be made from reworked materials. This new process (P-RW) must be put into a new record for the finished part number in the BLDOPT file. All other data for the BLDOPT record may be copied from what was entered for the finished part originally for the 'Location' and 'PartNumber'. The effective start date of the BLDOPT record may come from the 'WorkOffStart' and the effective end date will be set to an arbitrary date far into the future such as 12/31/9999. If the 'WorkOffStart' field is blank, or invalid, then the start date may be set to an arbitrary date of long ago such as 01/01/1999.

If rework materials template 208 indicates that a created material is reworkable (i.e., 'Reworkable' field="Y"), then a BLDOPT record is created for the reworkable material (also referred to as the Component) with a process code of P-RW if one does not already exist. This is done in order specify that the item is created by the rework process.

At step 308, a yield record is created for the test part number and primary process with the yield and cycle time of the finished part number. A yield record is also created for the rework part number and primary process with a yield of 1.0, a process code the same as the primary process and a cycle time equal to the rework cycle time for the part. If no rework cycle time is defined in rework cycle time template 204, the default is one day.

If the 'MultiplePass' flag of rework yield template 202 is set to "Y", a BLDOPT record is created for the rework part number and the looping process, with a yield of (1 minus 'ReworkScrap'), a process code of P_RW and a cycle time equal to the 'ReworkCycleTime' for the part. If no rework cycle time is defined, a reasonable default value is used instead. A BLDOPT record is created for the finished part number, but for process P_RW. This record defaults to 100% yield and 0 days cycle time. The yield record for the initial finished part number, primary process is set to 100% yield and 0 days of cycle time.

At step 310, speedsort records are created. The tested part number is sorted into the finished part and into the rework part. The distribution rate to the finished part is the FirstPassYield, and the distribution rate to the rework part is (1 minus the FirstPassYield). These records are created for the process code based on what was entered for the finished part originally, and the effective dates come from the rework yield template 202.

If the MultiplePass flag of rework yield template 202 is set to "Y", the rework part number, primary process, then get sorted to the finished part. The distribution rate is the 'ReworkYield' of rework yield template 202 and the process is P-RW. The effective dates also come from the rework yield template 202. If the MultiplePass flag is set to "Y", then another speedsort record is created for the rework part number, primary process to sort itself. The distribution rate for this record is (1 minus ReworkYield), and the process is P_RW. The effective dates come from rework yield template 202.

Any parts created from the rework part number, primary process, are then established with a distribution rate that reflects a rate of creation. If in the rework materials template 208 the ConsumeCreateFlag field indicates "create", then a new row is added to the speedsort record. The UsageRate of rework material template 208 will be used as the distribution rate. The effective dates come from rework materials template 208. If the Reworkable flag of rework materials template 208 is set to "Y", then the part number becomes a rework part, and its first two digits are set to "RW".

At step 312, BOM records are created. This involves inserting the test part number into the product structure and requires that all of the components of the finished part number be linked to the test part number instead. The finished part number and primary process, are linked to the test part number by the primary process, a QtyPer of 1 and a BinFlag field is set to "Y". These fields are represented in the BOM record. The ComponentLoc=the (manufacturing) Location, and the CompProcess is the primary process. These fields are also represented in the BOM record. The finished part and rework process are linked to the rework part number with a process of P_RW, and QtyPer of 1, and if the MultiplePass of rework yield template 202 is set to "Y", then the BinFlag is set to "Y", otherwise the BinFlag is set to "N". The ComponentLoc=the (manufacturing) Location. The CompProcess is set to the primary process.

The rework part number and primary process is linked with the test part number with a process code of P1, a QtyPer of 1, and a BinFlag="Y". The ComponentLoc=the (manufacturing) Location and the CompProcess is the primary process.

If the MultiplePass flag of rework yield template 202 is set to "Y", then the rework part number, rework process, needs to specify what parts it consumes. It is linked to itself with a CompProcess equal to the primary process. Any other parts consumed in the rework process are then established with a consumption rate (QtyPer) that reflects a rate of consumption. If in the rework materials template 208, the ConsumeCreateFlag field indicates "CONSUME", then a new row is added to the BOM file. The UsageRate will be used as the QtyPer. The effective dates come from rework materials template 208. This BOM record is linked to the finished PN with a process of P_RW. The OffsetDays in the rework materials template 208 will be used to populate the OffsetDays in the BOM record.

If the MultiplePass field="Y", then any other parts created in the manufacturing process that are identified as distributions in the speedsort record must have records created too. These would include records in the rework materials template 208 with a ConsumeCreateFlag setting of "CREATE". The same logic used in the BIN process described above is used to determine the material relationships. A BOM record is created for the created part, primary process. The CompProcess is set to equal the primary process. The OffsetDays in the rework materials template will be used to populate the OffsetDays in the BOM record.

A BOM record is created for the "reworkable" material described in step 306. This is where the process information that was retained is used. The BOM record reflects the created material as the assembly.

Capacity consumption records are created at step 314. The rework process will consume capacity based upon the finished part number. Records in the rework capacity template will be compared to the original capacity consumption file, and when a match in the Location, PartNumber, and WorkCenter is found, the data will be copied from the finished part number primary process to the finished part number/rework process. The BaseConsumption field of rework capacity template 206 is multiplied by the ReworkWeightFactor, also of rework capacity template 206.

If the CopyFromPN field is populated during the drill down process, then a 'lookup' in the capacity consumption record is performed for the Location, CopyFromPN, and WorkCenter. If a match is found, the logic described above with respect to step 314 is performed.

If the BaseConsumption field is not null, then the information from the rework capacity template 206 is copied into the capacity consumption file. The ConsumptionRate in the capacity consumption record is equal to the ReworkWeightFactor multiplied by the BaseConsumption value. The capacity consumption record for the finished part, primary process is moved down to the untested part number. This may be accomplished by modifying the part number. The part number is changed from the '00000PN' to the '0UT00PN'.

At step 316, the inventory on the finished part is converted to the rework by using the QualInd field of an inventory cost record in order to represent failed products. A QualInd of "RW" causes the inventory to be converted to the rework part. This is done by changing the part number on the inventory record. Once the part number is changed, the QualInd field can be set to blanks.

A QualInd of "UT" will cause the inventory record to have the part number changed to the untested part number. Once the part number is changed, the QualInd can be set to blanks.

At step 318, process cost parameters are established and life cycle considerations are addressed. The process costs of the "primary" and "rework" processes are set so that the desired build behavior is achieved over the life of the product. Typically, the "costs" or penalties used in a linear programming application are not real costs per se; rather, such costs are artificially created so that the result of a linear programming solver is palatable to the business planner. Consequently, the absolute magnitudes of the costs are not important. It is the relative values of one cost versus the others that drives the behavior of the linear program.

To obtain the desired life cycle behavior, it is usually only necessary to have a "primary" process cost which is moderately cheaper than the "rework" process cost. This results in the early time period demands being satisfied by the primary process with the residue of reworkable inventory available to satisfy later demands. During the intermediate time frame, an LP will mix-and-match between primary and rework production. During the later (e.g., end of life) time frame, the business will want to work off the reworkable inventory. In that time frame, it is desirable to have non-negligible ending inventory costs to encourage the consumption of the reworkable inventory (at the expense of building the primary process earlier than otherwise necessary). Inventory costs during the earlier (e.g., pre-end of life) time frame may be zero or near zero.

At step 320, the information acquired in steps 300-318 is fed into APS 108 to complete the integrated rework manufacturing cycle. The APS 108 may be a linear programming model such as described in U.S. Pat. No. 5,971,585 (referenced above).

Figure 4:
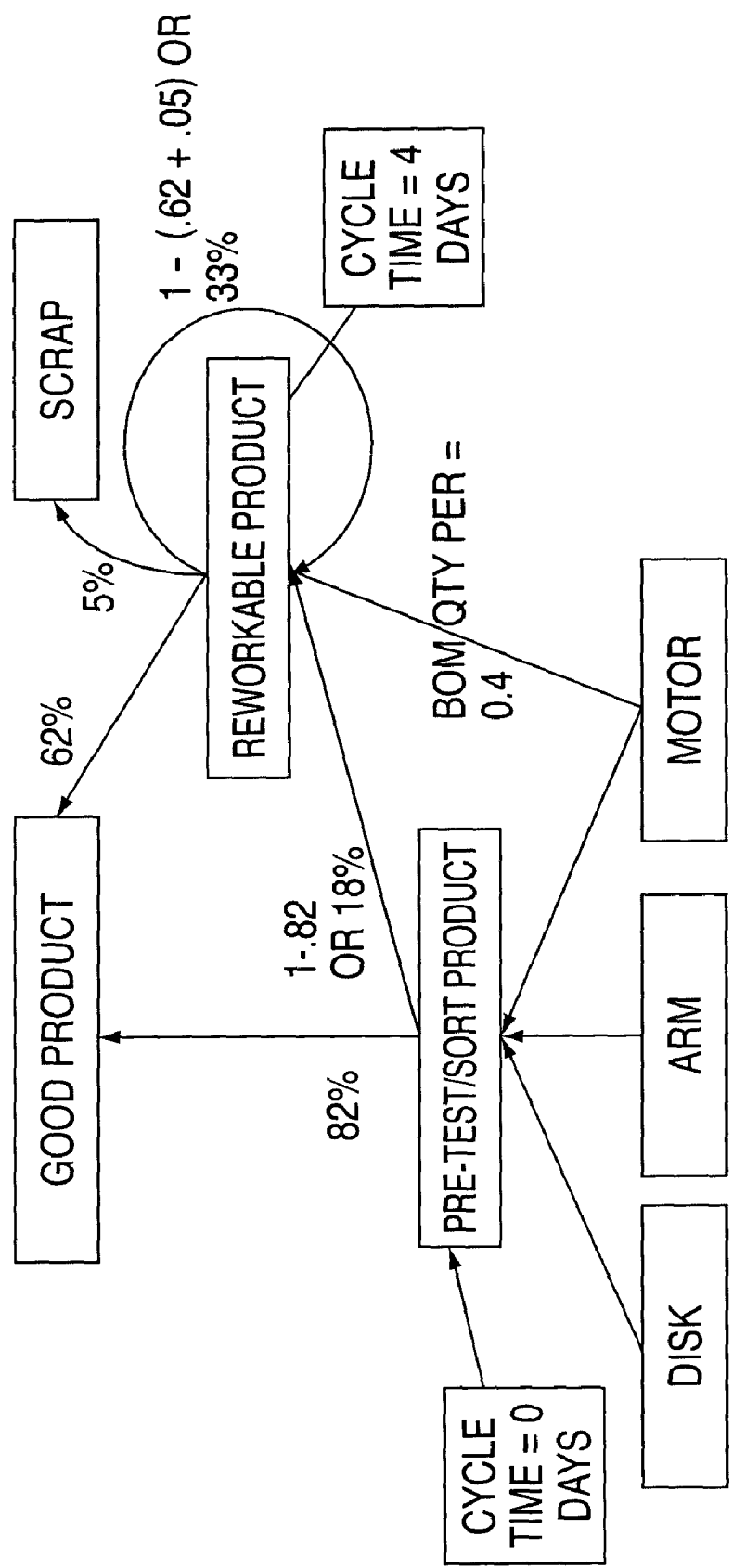
FIG. 4 illustrates a sample Bill of Material (BOM) flow.
Figure 5:
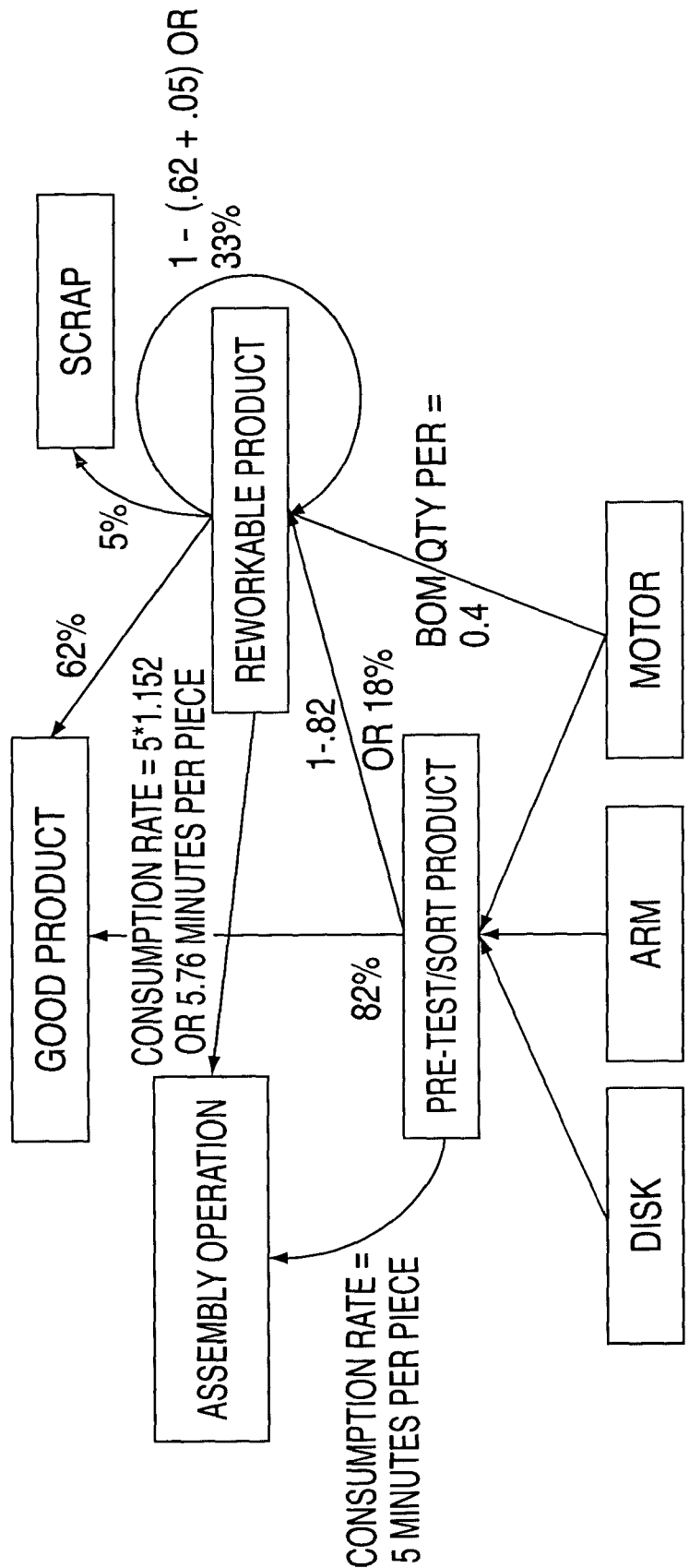
FIG. 5 illustrates a rework BOM flow with capacity constraints.
Figure 6:
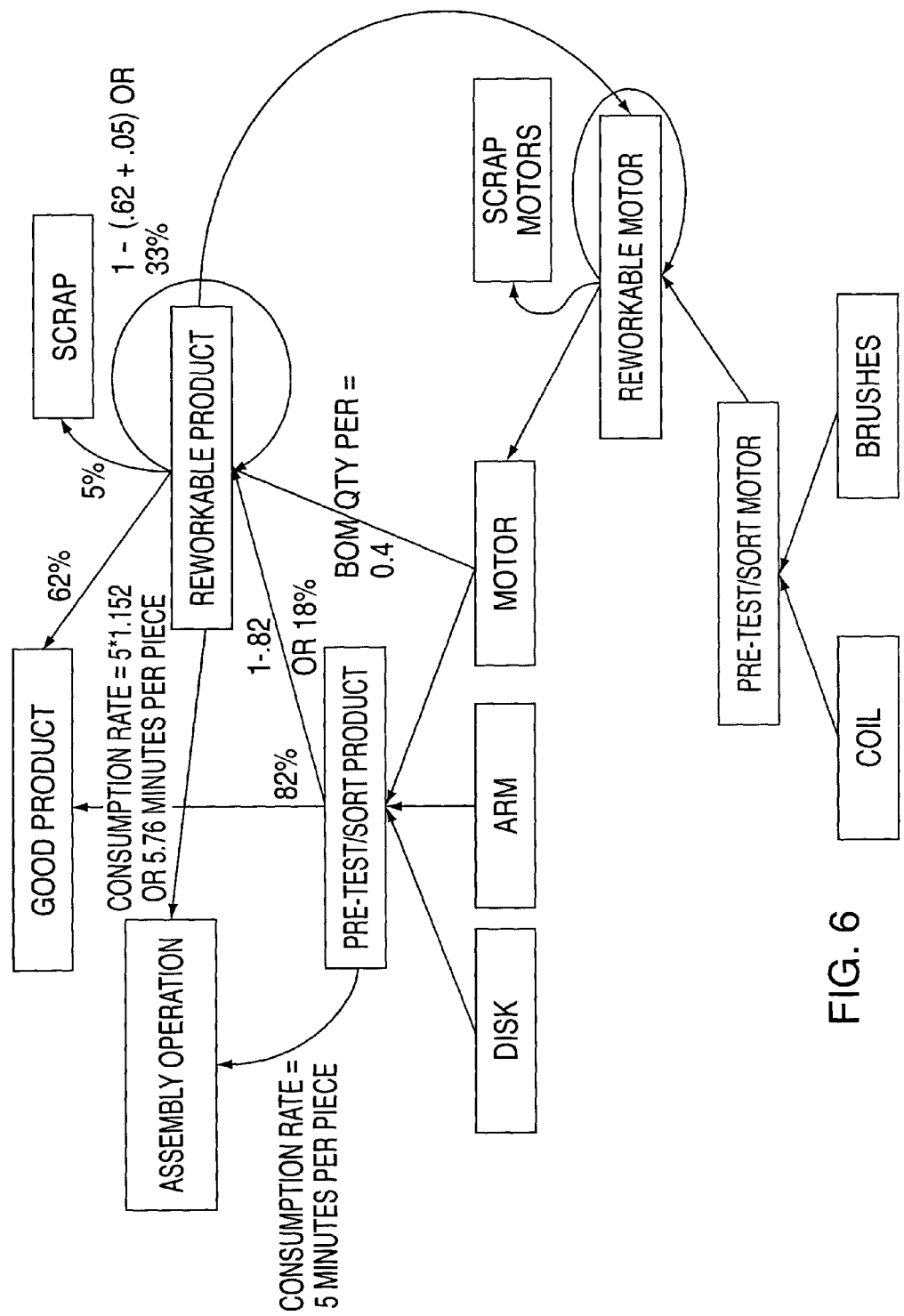
FIG. 6 illustrates a BOM flow where both assemblies and components are reworkable.

FIG. 4 is an illustration of the bill-of-material structure which shows the flow of parts from components to finished assemblies. Hard drive manufacturing is used as an example, recognizing that those skilled in the art will be able to apply the concepts to other industries and product structures. In FIG. 4 there is a "pre-test/sort Product" that has been instituted to designate the stage of manufacturing where a disk, arm, and motor have been assembled but the unit has not yet been tested. For ease of illustration and without loss of generality, this pre-test/sort Product has been assembled in zero cycle time or lead time. The pre-test/sort Product is then tested. In this example, the test results in 82% of the pre-test/sort Product being designated as "Good Product" (e.g., a high quality hard disk drive) and 18% of the tested product being designated as "Reworkable product." Further, when the "Reworkable product" is reworked and tested, 62% results in "Good Product," 5% is scrapped, and 33% requires additional rework. Observe that the "Good Product" may be produced directly from the pre-test/sort Product or from the reworking of the "Reworkable product." The invention models this by using alternate processes (ref. U.S. Pat. No. 5,943,484). In this example, the primary or "prime" process consumes the pre-test/sort Product as its component, and the "rework" process consumes the "Reworkable product." FIG. 5 also illustrates that both of these processes may consume capacity at the "Assembly Operation", however, with different consumption rates. Additionally, in FIG. 5, 40% percent of the time, the reworking of the product requires the replacement of the drive's motor; consequently, our invention models this by using a bills of material qty_per of 0.4 applicable to the production of the "Good Product" when using the "rework" process. Also, the motor assembly itself is further built from a "pre-test/sort Motor" which requires two components, coils and brushes, and this assembly also has a rework flow associated with it. FIG. 6 further illustrates the fact that assemblies may result in salvageable components that flow upstream in the supply chain. For instance, a "Reworkable Product" may result in the creation of a salvaged "Reworkable Motor".

As can be seen by the above, the rework system provides a circular flow of materials' structure in order to leverage rework operations into a manufacturing execution system. The rework system is modeled using a set of inventory balance equations to describe the flow of materials from one location to another and assigns a unique part number to the part number to be reworked. Sort percentages and cost penalties are used on the part to identify defective parts and so that the desired behavior during a product life cycle can be emulated in the planning process.

The rework system provides a method for achieving a production plan that integrates the rework aspect of a manufacturing system. It involves the storage and management of necessary data for modeling material flows of a rework system with respect to the overall manufacturing system. It also provides a method for mapping the data structures to a mathematical model of the manufacturing system for optimization of advanced planning decisions including those associated with the rework process. The system and method integrate the planning of a rework manufacturing process with established planning objectives (e.g. customer service, short lead times, low inventory, and prioritized allocation of supply and capacity) to, compute a feasible production plan for an enterprise.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While preferred embodiments have been shown and described, various modifications and substitutions may be made thereto without departing from the spirit and scope of the invention. Accordingly, it is to be understood that the present invention has been described by way of illustration and not limitation.

The invention claimed is:

1. A method for integrating rework operations into a planning process comprising:
    providing at least one rework Bill of Materials flow for use in conjunction with other Bills of Materials flow in a production planning process, the at least one rework Bill of Materials flow using inventory balance equations that describe a flow of rework Bill of Materials between inventory holding points;
    forecasting rework parametric information associated with said at least one rework Bill of Materials flow; said rework parametric information including:
        yields;
        cycle times;
        and
        rework materials;
    applying the rework parametric information to the at least one rework Bill of Materials flow resulting in a manufacturing plan for rework operations; and
    generating an integrated manufacturing plan that includes the manufacturing plan for rework operations and the other Bills of Materials flow.

2. The method of claim 1, wherein the rework parametric information further includes capacity constraints, the method further comprising:
    balancing capacity constraints for said at least one rework Bill of Materials flow with capacity constraints for said other Bills of Materials flow.

3. The method of claim 2, further comprising a rework process, said rework process comprising:
    executing said integrated manufacturing plan wherein said rework parametric information for materials not consumed during execution but determined to be reworkable are fed back into a second rework Bill of Materials flow operable for being consumed in a new integrated manufacturing plan.

4. The method of claim 1, wherein said yields include:
    a percentage of product determined to have successfully passed testing.

5. The method of claim 1, wherein said cycle time includes:
    an amount of time required to rework a product including wait time.

6. The method of claim 1, wherein said rework materials define materials created during a rework process.

7. The method of claim 1, wherein said integrated manufacturing plan is executed via a linear programming application.

8. A storage medium encoded with machine-readable computer program code for integrating rework operations into a planning process, said storage medium including instructions for causing a computer to implement a method comprising:
    providing at least one rework Bill of Materials flow for use in conjunction with other Bills of Materials flow in a production planning process, the at least one rework Bill of Materials flow using inventory balance equations that describe a flow of rework Bill of Materials between inventory holding points;
    forecasting rework parametric information associated with said at least one rework Bill of Materials flow; said rework parametric information including:
        yields;
        cycle times;
        and
        rework materials;
    applying the rework parametric information to the at least one rework Bill of Materials flow resulting in a manufacturing plan for rework operations; and
    generating an integrated manufacturing plan that includes the manufacturing plan for rework operation and the other Bills of Material flow.

9. The storage medium of claim 8, wherein the rework parametric information further includes capacity constraints, the storage medium further comprising instructions for causing said computer to implement:
    balancing capacity constraints for said at least one rework Bill of Materials flow with capacity constraints for said other Bills of Materials flow.

10. The storage medium of claim 9, further comprising instructions for causing said computer to implement a rework process, said rework process comprising:
    executing said integrated manufacturing plan wherein said rework parametric information for materials not consumed during execution but determined to be reworkable are fed back into a second rework Bill of Materials flow operable for being consumed in a new integrated manufacturing plan.

11. The storage medium of claim 8, wherein said yields include:
    a percentage of product determined to have successfully passed testing.

12. The storage medium of claim 8, wherein said cycle time includes:
   an amount of time required to rework a product including wait time.

13. The storage medium of claim 8, wherein said rework materials define materials created during a rework process.

14. The storage medium of claim 8, wherein said integrated manufacturing plan is executed via a linear programming application.

15. A system for integrating rework operations into an advanced planning process comprising:
   a server executing:
      an advanced planning system;
      an enterprise resource planning system; and
      a rework system;
   a technical data repository in communication with said server; and
   rework parametric information comprising:
      yields;
      cycle times; and
      rework materials;
   wherein said rework system implements:
      providing at least one rework Bill of Materials flow for use in conjunction with other Bills of Materials flow in a production planning process, the at least one rework Bill of Materials flow using inventory balance equations that describe a flow of rework Bill of Materials between inventory holding points;
      forecasting rework parametric information associated with said at least one rework Bill of Materials flow;
      applying the rework parametric information to the at least one rework Bill of Materials flow resulting in a manufacturing plan for rework operations; and
      generating an integrated manufacturing plan that includes the manufacturing plan for rework operations and the other Bills of Material flow.

16. The system of claim 15, wherein the parametric information further includes capacity constraints, said rework system further implementing:
   balancing capacity constraints for said at least one rework Bill of Materials flow with capacity constraints for said other Bills of Materials flow.

17. The system of claim 16, further comprising a rework process, said rework process implementing:
   executing said integrated manufacturing plan wherein said rework parametric information for materials not consumed during execution but determined to be reworkable are fed back into a second rework Bill of Materials flow operable for being consumed in a new integrated manufacturing plan.

18. The system of claim 15, wherein said integrated manufacturing plan is executed via a linear programming application.

* * * * *